United States Patent
Kim et al.

(10) Patent No.: US 9,185,621 B2
(45) Date of Patent: Nov. 10, 2015

(54) SERVER FOR UNDERTAKING CONTROL PLANE IN MOBILE COMMUNICATION NETWORK AND METHOD FOR SUPPORTING TRAFFIC DETOUR SERVICE MOBILITY IN SAME SERVER

(75) Inventors: Taehyeon Kim, Anyang-si (KR); Laeyoung Kim, Anyang-si (KR); Jaehyun Kim, Anyang-si (KR); Hyunsook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 14/004,396

(22) PCT Filed: Apr. 3, 2012

(86) PCT No.: PCT/KR2012/002491
§ 371 (c)(1),
(2), (4) Date: Sep. 10, 2013

(87) PCT Pub. No.: WO2012/138099
PCT Pub. Date: Oct. 11, 2012

(65) Prior Publication Data
US 2014/0003241 A1    Jan. 2, 2014

Related U.S. Application Data

(60) Provisional application No. 61/471,184, filed on Apr. 3, 2011.

(51) Int. Cl.
*H04W 4/00* (2009.01)
*H04W 36/22* (2009.01)
(Continued)

(52) U.S. Cl.
CPC .............. *H04W 36/22* (2013.01); *H04W 36/34* (2013.01); *H04W 8/082* (2013.01); *H04W 88/16* (2013.01)

(58) Field of Classification Search
None
See application file for complete search history.

(56) References Cited

U.S. PATENT DOCUMENTS

2011/0045834 A1*  2/2011  Kim et al. ............... 455/438
2011/0116469 A1*  5/2011  Bi et al. ................... 370/331
(Continued)

FOREIGN PATENT DOCUMENTS

| KR | 10-2011-0020161 | 3/2011 |
| KR | 10-2011-0020164 | 3/2011 |
| WO | 2011/020624 | 2/2011 |

OTHER PUBLICATIONS

3rd Generation Partnership Project (3GPP), "Technical Specification Group Services and System Aspects; General Packet Radio Service (GPRS); Service description; Stage 2 (Release 10)," 3GPP TS 23.060 V10.3.0, Mar. 2011, XP050548096, 320 pages.
(Continued)

*Primary Examiner* — Michael J Moore, Jr.
(74) *Attorney, Agent, or Firm* — Lee, Hong, Degerman, Kang & Waimey

(57) ABSTRACT

The present invention provides a method for supporting mobility of selected IP traffic offload (SIPTO) by a server undertaking a control plane in a mobile communication network. The method can comprise the following steps: receiving a handover request message for a terminal receiving a SIPTO service by means of a source base station to a target base station; deciding whether to deactivate the SIPTO service; performing a process for disconnecting a public data network connection (PDN) for the SIPTO, based on the decision; and transmitting to the terminal via the source base station a message including information for reactivating the SIPTO after the handover, according to the decision.

10 Claims, 14 Drawing Sheets

(51) Int. Cl.
*H04W 36/34* (2009.01)
*H04W 88/16* (2009.01)
*H04W 8/08* (2009.01)

(56) References Cited

U.S. PATENT DOCUMENTS

| | | | |
|---|---|---|---|
| 2011/0235546 A1* | 9/2011 | Horn et al. | 370/254 |
| 2012/0076121 A1* | 3/2012 | Choi et al. | 370/338 |
| 2012/0314688 A1* | 12/2012 | Taleb et al. | 370/331 |
| 2013/0051327 A1* | 2/2013 | Kim et al. | 370/328 |
| 2013/0089076 A1* | 4/2013 | Olvera-Hernandez et al. | 370/332 |
| 2013/0308527 A1* | 11/2013 | Chin et al. | 370/328 |
| 2013/0315068 A1* | 11/2013 | Kim et al. | 370/236 |
| 2014/0119340 A1* | 5/2014 | Stojanovski et al. | 370/331 |

OTHER PUBLICATIONS

3rd Generation Partnership Project (3GPP), "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.3.0, XP050548092, Mar. 2011, 284 pages.

European Patent Office Application Serial No. 12767761.5, Search Report dated Mar. 20, 2015, 9 pages.

* cited by examiner

SERVER FOR UNDERTAKING CONTROL PLANE IN MOBILE COMMUNICATION NETWORK AND METHOD FOR SUPPORTING TRAFFIC DETOUR SERVICE MOBILITY IN SAME SERVER

CROSS-REFERENCE TO RELATED APPLICATIONS

This application is a National Stage filing under 35 U.S.C. 371 of International Application No. PCT/KR2012/002491, filed on Apr. 3,2012, which claims the benefit of U.S. Provisional Application Ser. No. 61/471,184, filed on Apr. 3, 2011, the contents of which are all hereby incorporated by reference herein in their entirety.

TECHNICAL FIELD

The present invention relates to a server for undertaking a control plane in a mobile communication network and a method for supporting mobility of a selected IPF traffic offload (SIPTO) service in the same server.

BACKGROUND ART

A 3GPP that establishes a technology standard of a $3^{rd}$ generation mobile communication system has started a research into long term evolution/system architecture evolution (LTE/SAE) technology as part of an effort to optimize and improve performance of 3 GPP technologies from the end of 2004 in order to cope with various forums and new technologies associated with $4^{th}$ generation mobile communication.

SAE that is progressed around 3GPP SA WG2 is a research into network technology to determine a structure of a network with an LTE work of a 3GPP TSG RAN and support mobility between model networks and one of key standardization issues of the 3GPP. This is a work for developing a 3GPP system to a system that supports various wireless access technologies based on an IP and the work has been progressed for the purpose of an optimized packet based system that minimizes a transmission delay with a further improved data transmission capability.

An SAE higher-level reference model defined in the 3GPP SA WG2 includes a non-roaming case and a roaming case of various scenarios, and a detailed content may be referred in TS 23.400a and TS 23.400b which are 3GPP standard documents. A network structure diagram of FIG. 1 shows schematic reconfiguration of the SAE higher-level reference model.

FIG. 1 is a structural diagram of an evolved mobile communication network.

One of largest features of the network structure of FIG. 1 is based on a 2 tier model of eNodeB of an evolved UTRAN and a gateway of a core network and although accurately coincides with each other, the eNodeB 20 has functions of NodeB and RNC of an existing UMTS system and the gateway has an SGSN/GGSN function of the existing system.

Another key feature is that a control plane and a user plane between an access network and the core network are exchanged to different interfaces. In the existing UMTS system, one Iu interface exists between an RNC and an SGSN, while a mobility management entity (MME) 51 that undertakes processing of a control signal has a structure separated from a gateway (GW), and as a result, two interfaces of S1-MME and S1-U are respectively used. The GW includes a serving-gateway (hereinafter, referred to as 'S-GW') 52 and a packet data network gateway (hereinafter, referred to as 'PDN-GW' or 'P-GW') 53.

FIG. 2 is a diagram illustrating the relationship between (e)NodeB and Home (e)NodeB.

In the $3^{rd}$ or $4^{th}$ mobile communication system, an attempt to increase a cell capacity is continuously made in order to support a high-capacity service and a bidirectional service such as multimedia contents, streaming, and the like.

That is, as various large-capacity transmission technologies are required with development of communication and spread of multimedia technology, a method for increase a radio capacity includes a method of allocating more frequency resources, but there is a limit in allocating more frequency resources to a plurality of users with limited frequency resources.

An approach to use a high-frequency band and decrease a cell radius has been made in order to increase the cell capacity. When a cell having a small radius, such as a pico cell is adopted, a band higher than a frequency used in the existing cellular system may be used, and as a result, it is possible to transfer more information. However, since more base stations should be installed in the same area, higher cost is required.

In recent years, a Femto base station such as a Home (e)NodeB 30 has been proposed while making the approach to increase the cell capacity by using the small cell.

The Home (e)Node 30 has been researched based on a RAN WG3 of the 3GPP Home (e)NodeB and in recent years, the Home (e)NodeB 30 has been in earnest researched even in an SA WG.

The (e)NodeB 20 illustrated in FIG. 2 corresponds to a macro base station and the Home (e)NodeB 30 illustrated in FIG. 2 may correspond to the Femto base station. In the specification, (e)NodeB intends to be described based on terms of the 3GPP and (e)NodeB is used when NodeB and eNodeB are mentioned together. Further, Home (e)NodeB is used when Home NodeB and Home eNodeB are mentioned together.

Interfaces marked with dotted lines are used to transmit control signals among the (e)NodeB 20, the Home (e)NodeB 30, and an MME 510. In addition, interfaced marked with solid lines are used to transmit data of the user plane.

FIG. 3 illustrates a problem in prior art.

As illustrated in FIG. 3, traffic is overloaded or congested in an interface between the (e)NodeB 20 and the S-GW 52, or traffic is overloaded or congested in an interface between the Home (e)NodeB 30 and the S-GW 52, download data or to a UE 10 or upload data from the UE 10 is not correctly transmitted and is thus failed.

Alternatively, even when an interface between the S-GW 52 and the PDN-GW 53 or an interface between the PDN-GW 53 and an Internet protocol (IP) service network of a mobile communication operator is overloaded or congested, the downlink data to the UE 10 or the uploaded data from the UE 10 is not correctly transmitted and is thus failed.

Further, when the UE is handed over from a present cell in which the UE receive a service to another cell, if the another cell is in an overload state, the service of the UE is dropped.

In order to solve the problem, mobile communication operators have changed the S-GW 52 and the PDN-GW 53 to high-capacity equipment or additionally installed new equipment, but very higher cost therefor is required. Further, the amount of transmitted and received data geometrically increases with each passing day, overload occurs immediately.

Meanwhile, various schemes were presented, which optimize the S-GW 52 and the PDN-GW 53 without additionally installing the mobile communication network. For example, SIPTO, that is, technology was presented, which transmits specific IP traffic (for example, an Internet service) of the UE by selecting an optimal route in a macro access network and offloads the IP traffic to a route through nodes of not the mobile communication network but a public network, that is, a wired network (selected IP traffic offload) without transmitting and receiving the IP traffic to and from the route through the mobile communication network in a Femto access network (for example, Home (e)NB).

FIG. 4 illustrates a concept of selected IP traffic offload (SIPTO).

Referring to FIG. 4, for example, a mobile communication system such as an evolved packet system (EPS) is illustrated. The EPS system includes the (e)NodeB 20, the MME 51, the S-GW 52, and a P-GW 53. In addition, the home (e)NodeB 30 is illustrated.

In this case, as illustrated, the selected IP traffic offload (SIPTO) technology offloads specific IP traffic (for example, an Internet service) of the UE 10 to nodes of a wired network 70 without passing through nodes in an IP service network 60 of a mobile communication operator.

For example, when the UE 10 is allowed to access the (e)NodeB 20, the UE 10 creates a session passing through the wired network 70 such as a public communication network through the (e)NodeB 20 and may perform an IP network service through the session. In this case, a operator policy and subscription information may be considered.

In order to create the session as such, a gateway, that is, a local gateway that undertakes some of functions of a GGSN in a UMTS or a local gateway that undertakes some of functions of a PDN gateway (P-GW) in an EPS may be installed at a location which is close to the (e)NodeB 20.

The local gateway is called a local GGSN or a local P-GW. A function of the local GGSN or local P-GW is similar to the function of the GGSN or P-GW.

As described above, the SIPTO technology has presented a concept of creating a session in order to offload the data of the UE to the wired network such as the public communication network through the (e)NodeB 20, that is, the macro base station.

However, the SIPTO technology in prior art has a problem that mobility is not assured. That is, when the UE performs handover from a source base station to a target base station while receiving an SIPTO service, cut-off of the service occurs.

For example, when the terminal performs handover to the Home (e)NodeB 30 during using the Internet by receiving the SIPTO service through the (e)NodeB 20, that is, the macro base station, data which the UE is transmitting is all lost and an Internet browser of the UE does not respond. Therefore, user's experience deteriorates.

In prior art described above, a scheme is presented, which creates a session for the data in order to offload the data of the UE to the wired network such as the public communication network when the UE stays at a geographically constant location for a long period.

However, the prior art does not consider movement of the UE. That is, the aforementioned prior art considers a situation in which the UE stays at the constant location similarly to wireless LAN technology.

However, the UE as a mobile terminal may frequently move or move long distances. Therefore, based on the aforementioned prior art, it is impossible to provide a service to a UE which is wide in movement range.

DISCLOSURE OF THE INVENTION

An object of the present invention is to solve the aforementioned problems.

That is, an object of the present invention is to present technology that hands over a session for data of UE which is offloaded to a wired network such as a public communication network when the UE moves. In other words, the object of the present invention is to present a mobility management method of the session for the offloaded data.

Further, another object of the present invention is to present a method of offloading data of UE positioned in a coverage of a source base station, for example, a source (e)NodeB to a wired network such as a public communication network and thereafter, appropriately processing the session for the offloaded data according to a radio capacity of a target base station when the UE moves to the inside of the coverage of the target base station, for example, the (e)NodeB.

In order to achieve the aforementioned objects, the specification provides a method of supporting mobility of selected IP traffic offload (SIPTO), which is performed by a server undertaking a control plane in a mobile communication network. The method includes: receiving a handover required message for a terminal, which receives a SIPTO service via a source base station, toward target base station; deciding whether to deactivate the SIPTO service; performing a process for releasing a public data network (PDN) connection for the SIPTO, based on the decision; and transmitting to the terminal via the source base station a message including information for reactivating the SIPTO after the handover, according to the decision.

The source base station may be a Home (e)NodeB and the target base station may be an (e)NodeB.

The terminal receives the SIPTO service from another (e)NodeB before receiving the SIPTO service from the source base station and performs handover to the source base station.

The message may correspond to any one of a handover command message, a bearer deactivation request message, and a deactivate bearer request message.

The method may further include transmitting, by the server, a relocation request message or a forward relocation request message including bearer context information other than PDN information for the SIPTO service to a target mobility management entity (MME).

Meanwhile, the specification provides a method of supporting mobility of a selected IP traffic offload (SIPTO) service which a terminal receives from a source base station.

The supporting method may include receiving, by the terminal, a message including information for reactivating the SIPTO after handover from the source base station; performing, by the terminal, handover from the source base station to the target base station; and transmitting, by the terminal, a public data network (PDN) connection request message to the target base station based on the information.

The source base station may be a Home (e)NodeB and the target base station may be an (e)NodeB.

The terminal receives the SIPTO service from another (e)NodeB before receiving the SIPTO service from the source base station and performs handover to the source base station.

Meanwhile, the message may correspond to any one of a handover command message, a bearer deactivation request message, and a deactivate bearer request message.

The method may further include deciding whether to reactivate the SIPTO service after the handover based on the information.

Meanwhile, the specification provides a server undertaking a control plane in a mobile communication network to assure mobility of a selected IP traffic offload (SIPTO) service. The server may include: a receiving unit receiving a handover required message for a terminal, which receives a SIPTO service via a source base station, toward target base station; a control unit deciding whether to deactivate the SIPTO service; and a transmitting unit performing a procedure for releasing public data network (PDN) connection for the SIPTO according to the decision of the control unit and transmitting a message including information to reactivate the SIPTO after the handover according to the decision to the terminal through the source base station.

The source base station may be a Home (e)NodeB and the target base station may be an (e)NodeB.

The terminal receives the SIPTO service from another (e)NodeB before receiving the SIPTO service from the source base station and performs handover to the source base station.

Meanwhile, the specification also provides a terminal receiving a selected IP traffic offload (SIPTO) service from a source base station.

The terminal may include: a receiving unit; a transmitting unit; and a control unit receiving a message including information to reactive the SIPTO after handover from the source base station by controlling the receiving unit and the transmitting unit, performing the handover from the source base station to the target base station, and transmitting a public data network (PDN) connection request message to the target base station based on the information.

According to the disclosure of the specification, when a 3GPP EPS supports a Home (e)NodeB, an Internet service is enabled by connecting a public network without an operator network through the Home (e)NodeB. Further, the present invention provides mobility management of a session which is offloaded to the public network.

MODES FOR CARRYING OUT THE PREFERRED EMBODIMENTS

Figure 1:
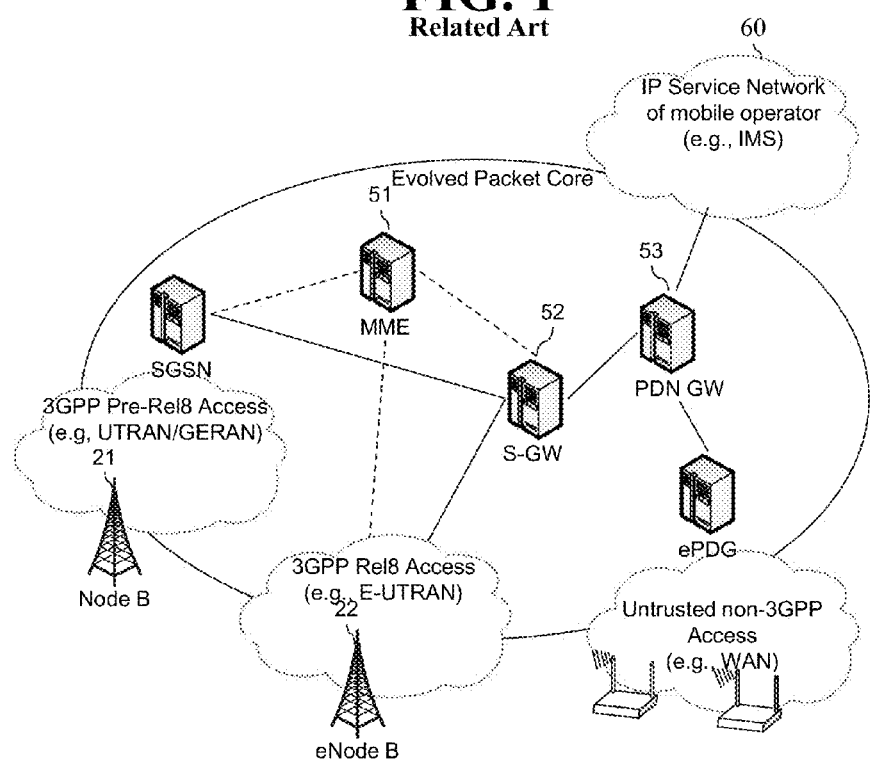
FIG. 1 is a structural diagram of an evolved mobile communication network.
Figure 2:
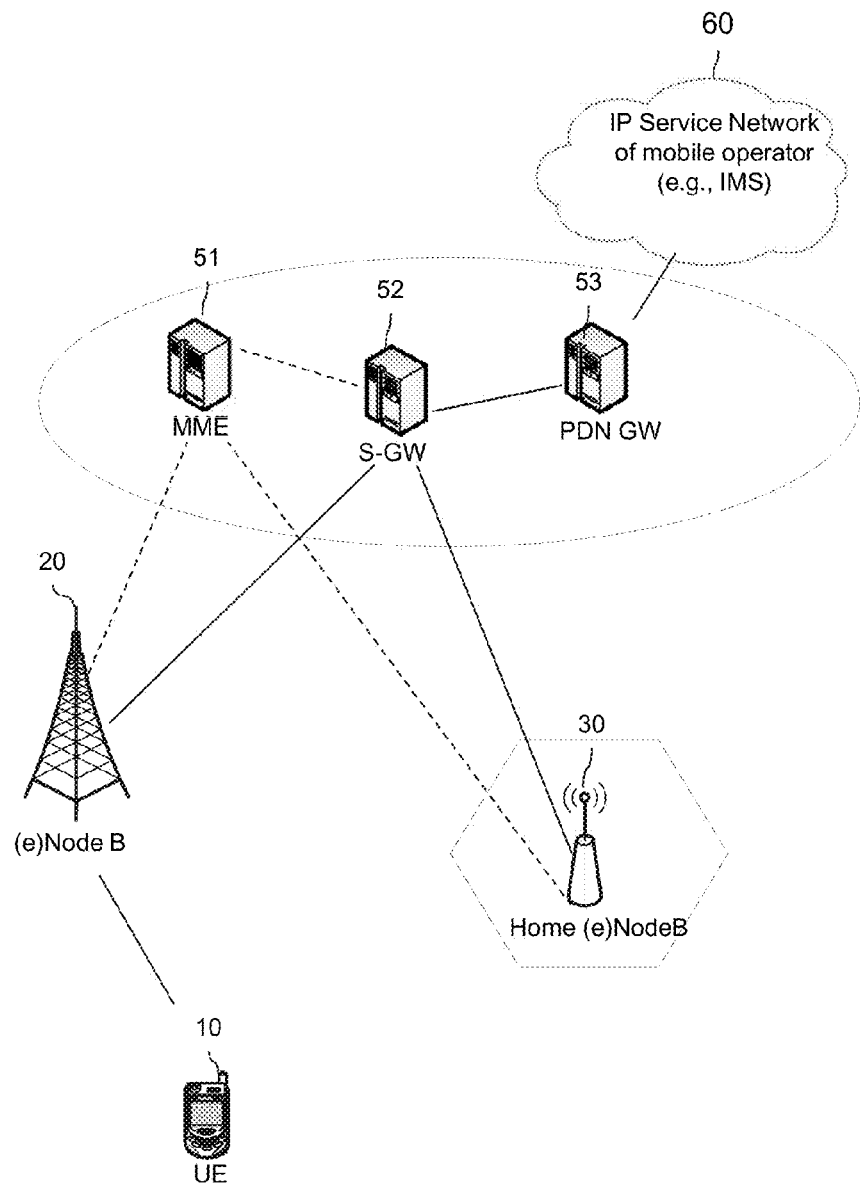
FIG. 2 is a diagram illustrating the relationship between (e)NodeB and Home (e)NodeB.
Figure 3:
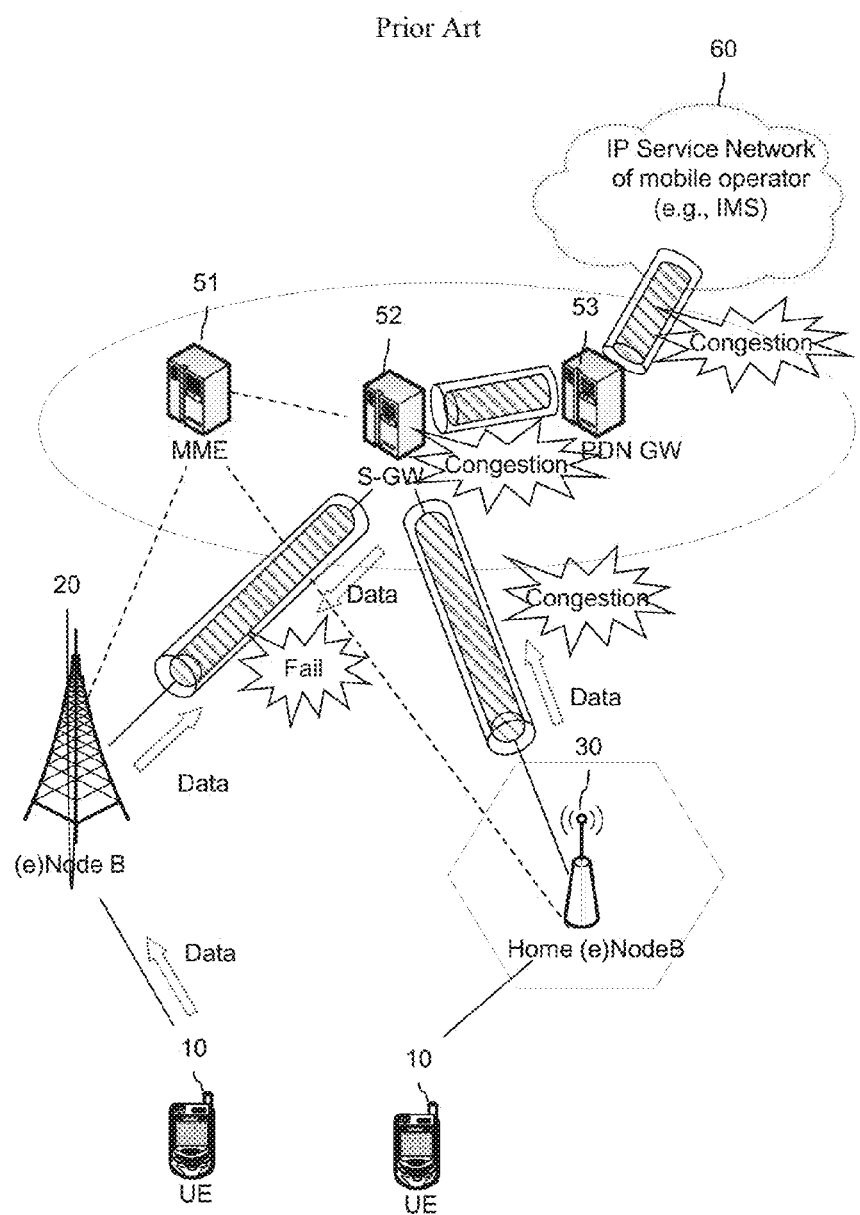
FIG. 3 illustrates a problem in prior art.
Figure 4:
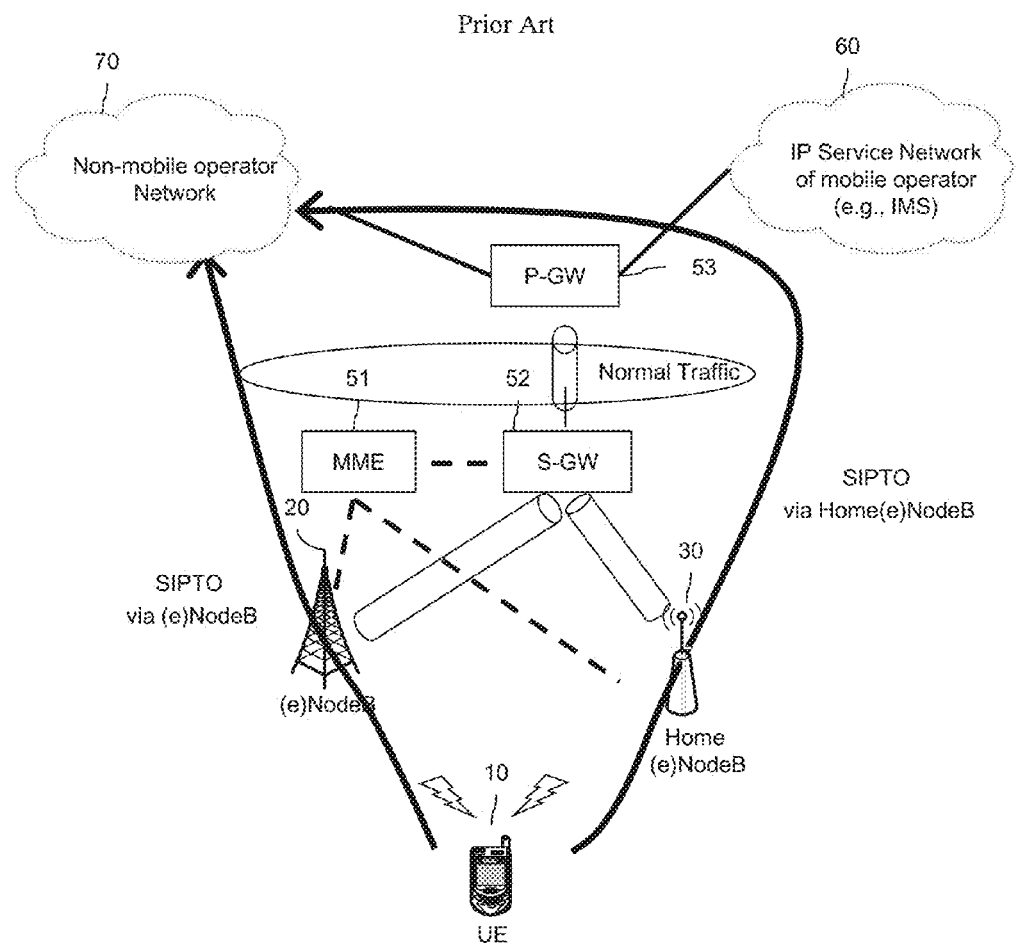
FIG. 4 illustrates a concept of selected IP traffic offload (SIPTO).

The present invention is described based on a universal mobile telecommunication system (UMTS) and an evolved packet core (EPC), but the present invention is not limited to the communication system, but may be applied to even all communication systems and methods to which the technical spirit of the present invention can be applied.

It is noted that Technical terms used in the specification are used to just describe a specific embodiment and do not intend to limit the present invention. Further, if the technical terms used in the specification are not particularly defined as other meanings in the specification, the technical terms should be appreciated as meanings generally appreciated by those skilled in the art and should not be appreciated as excessively comprehensive meanings or excessively reduced meanings. Further, when the technical term used in the specification is a wrong technical term that cannot accurately express the spirit of the present invention, the technical term is substituted by a technical term which can correctly appreciated by those skilled in the art to be appreciated. In addition, a general term used in the present invention should be analyzed as defined in a dictionary or according to front and back contexts and should not be analyzed as an excessively reduced meaning.

Moreover, if singular expression used in the specification is not apparently different on a context, the singular expression includes a plural expression. Further, in the present invention, it should not analyzed that a term such as "comprising" or "including" particularly includes various components or various steps disclosed in the specification and some component or some steps among them may not included or additional components or steps may be further included.

In addition, terms including ordinal numbers, such as 'first', 'second', etc. can be used to describe various components, but the components should not be limited by the terms. The terms are only used to differentiate one component from other components. For example, a first component may be named as a second component and similarly, the second component may also be named as the first component.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. On the contrary, it should be understood that when an element is referred to as being 'directly connected to' or 'directly coupled to' another element, another element does not intervene therebetween.

Hereinafter, embodiments of the present invention will be described in detail with reference to the accompanying drawings, in which like or similar reference numerals refer to like elements regardless of reference numerals and a duplicated description thereof will be omitted. In describing the present invention, when it is determined that the detailed description of the known art related to the present invention may obscure the gist of the present invention, the detailed description thereof will be omitted. Further, it is noted that the accompanying drawings are used just for easily appreciating the spirit of the present invention and it should not be analyzed that the spirit of the present invention is limited by the accompanying drawings. It should be analyzed that the spirit of the present invention is extended up to all changes, equivalents, or substitutions in addition to the accompanying drawings.

In the accompanying drawings, user equipment (UE) is exemplarily illustrated, but the illustrated UE may be mentioned as terms such as a terminal, mobile equipment (ME), and the like. Further, the UE may be portable devices such as a notebook, a cellular phone, a PDA, a smart phone, a multimedia device, and the like or unportable devices such as a PC, a vehicle mounted device, and like.

Definition of terms

Hereinafter, terms used in the specification will be defined in brief in order to assist understanding the present invention before a description referring the accompanying drawings.

UMTS: means a $3^{rd}$ mobile communication network as an abbreviation of Universal Mobile Telecommunication System.

EPS: Means a core network supporting a long term evolution (LTE) network as an abbreviation of Evolved Packet System. Network of a type in which the UMTS is evolved.

PDN (Public Data Network): An independent network at which a server providing a service is positioned APN (Access Point Name): Provided to UE as a name of an access point managed in the network. That is, the APN indicates a name (string) of the PDN. The corresponding PDN for transmitting and receiving data is decided based on the name of the access point.

Access control: A control procedure that permit an access system such as a Home (e)NodeB to use the UE or moves the UE to another access system.

TEID (Tunnel Endpoint Identifier): Set for each section by the unit of an end point ID of a tunnel set between nodes in the network and bearer of each UE.

NodeB: Installed outdoor as a base station of the UMTS network and a cell coverage scale corresponds to a macro cell.

eNodeB: Installed outdoor as a base station of an evolved packet system (EPS) and the cell coverage scale corresponds to the macro cell.

(e)NodeB: indicates a NodeB and an eNodeB.

Home NodeB: Installed outdoor as a base station of the UMTS network and the cell coverage scale corresponds to a Femto cell.

Home eNodeB: Installed outdoor as a base station of an EPS network and the cell coverage scale corresponds to the Femto cell.

Home (e)NodeB: Indicates a Home NodeB and a Home eNodeB.

Home (e)NodeB gateway: Is a gateway that is connected with one or more Home (e)NodeBs to serve to interface with the core network.

Home (e)NodeB Subsystem: Manages a wireless network by binding the Home (e)NodeB and the Home (e)NodeB gateway as one set. Both the Home (e)NodeB subsystem and the Home (e)NodeB manages the wireless network and serves to interwork with the core network, and may be considered as a form of one set. Therefore, hereinafter, terms of the Home (e)NodeB and the Home (e)NodeB subsystem are combinationally used.

MME: Serves to control each entity in the EPS in order to provide a session for the UE and mobility as an abbreviation of Mobility Management Entity.

Closed Subscriber Group: CSG): Means a group of one or more Home (e)NodeBs. The Home (e)NodeBs that belong to the CSG have the same CSG ID. Each user receives use permission for each CSG.

Closed Access Mode): Indicates that the Home (e)NodeB operates as a CSG cell. The Home (e)NodeB operates in such a manner of permitting only a user terminal permitted for the corresponding cell to access the Home (e)NodeB. That is, only a terminal that has an authority for specific CSG IDs which the Home (e)NodeB supports can access the Home (e)NodeB.

Open Access Mode: The Home (e)NodeB operates in the same manner as a normal cell (non-CSG cell) without a concept of the CSG. That is, the Home (e)NodeB operates like a normal (e)NodeB.

Hybrid access mode: Indicates that the Home (e)NodeB operates as the CSG cell, but permits even the non-CSG subscriber to access the Home (e)NodeB. The Home (e) permits a user terminal having a specific CSG ID which is supportable to access the corresponding cell to provide a Home (e)NodeB service and permits even a terminal having no CSG authority to access the Home (e)NodeB.

Selected IP Traffic Offload (SIPTO): Is technology that offloads specific IP traffic to not a mobile communication operator (for example, a 3GPP or a 3GPP2) but a wired network such as the Internet when the UE transmits the specific IP traffic through the Home (e)NodeB or the (e)Node B.

That is, the SIPTO means a method of selecting an optimal route in the macro cell and means a method of offloading the traffic to the wired network (fixed network) without passing through a wireless network (core network) of a operator in the Femto cell. That is, the SIPTO has a purpose of transmitting data by minimizing a route in the wireless network. Herein, a key point is that the operations are controlled through the core network.

SIPTO Femto (alternatively, Femto SIPTO): Is technology that offloads specific IP traffic to not the mobile communication operator (for example, the 3GPP or the 3GPP2) but the wired network such as the Internet when the UE transmits the specific IP traffic through the Home (e)NodeB.

SIPTO macro (alternatively, macro SIPTO): Is technology that offloads specific IP traffic to not the mobile communication operator (for example, the 3GPP or the 3GPP2) but the wired network such as the Internet when the UE transmits the specific IP traffic through the (e)NodeB.

Local IP Access (LIPA): Is technology that connects the Home (e)NodeB to a local network (that is, a small-scale network, for example, a family home network or a corporate network) and allows the UE in the Home (e)NodeB to access the local network through the Home (e)NodeB.

Local Gateway Is a gateway for enabling LIPA or SIPTO through the Home (e)NodeB, that is, transmitting data to the home network or directly to the wired network without passing through the core network. The local gateway is positioned between the Home (e)NodeB and the wired network, and enables creating a bearer between the Home (e)NodeB and the wired network or creating the bearer between the Home (e)NodeB and the local network, and transmitting data through the created bearer.

Session: The session is a passage for data transmission and the unit thereof may be PDN, bearer, IP flow unit, or the like. The respective units may be divided into a whole unit (APN or PDN unit) of a target network, a unit (Bearer unit) divided as a QoS therein, and a destination IP address unit.

PDN connection: Indicates connection from the terminal to the PDN, that is, association (connection) between the terminal expressed as the ip address and the PDN expressed as the APN. The PDN connection means connection between entities (terminal—PDN GW) in the core network so as to form the session.

UE Context: UE context information used to manage the UE in the network, that is, context information constituted by a UE id, mobility (present location, and the like), an attribute (QoS, priority, and the like) of the session.

Local PDN: Indicates an independent network such as the home network or the corporate network, not an external PDN.

Local Home(e)NodeB network: Indicates a network for accessing the local PDN and is constituted by the Home (e)NodeB and the L-GW.

Local network: Includes the local Home (e)NodeB network and the local PDN.

Meanwhile, hereinafter, schemes presented in the specification will be described below in brief.

Description of Scheme for Assuring Mobility of SIPTO Service

The Rel-10 of the 3GPP standard defined LIPA and SIPTO functions. The LIPA is A technique of providing a PDN connection to a local network in the Home (e)NB, and the SIPTO is divided into an SIPTO macro (alternatively, a macro SIPTO) and an SIPTO Femto (alternatively, a Femto SIPTO). The SIPTO macro represents offloading traffic of a terminal to a wired network such as a public network when the terminal accesses a macro cell and the SIPTO Femto represents offloading data of the terminal to the wired network such as the public network when the terminal a Femto cell.

The Rel-10 of the 3GPP standard makes a lot of discussion about the SIPTO Femto.

As such, if the SIPTO is applied when the terminal accesses the Femto cell, that is, the Home (e)NodeB, the LIPA service may also be used as it is. That is, in the case of applying the existing SIPTO function in the Home (e)NB subsystem, when an existing PDN is removed and the terminal requests the same PDN again, an LIPA PDN connection is set and used. To this end, in an L-GW, the LIPA PDN connection and the SIPTO PDN connection are created/managed to transmit data.

In this case, as considerations when the terminal moves, the LIPA PDN connection is released before the handover in the Rel-10 and when the handover is performed, only information from which the PDN connection for the LIPA is removed is transferred to a target MME.

Further, when the handover is performed, present SIPTO PDN connection is released by judgment of the MME after TAU/RAU and thereafter, creation of new SIPTO PDN connection is requested to the terminal.

Meanwhile, in the existing case, while the terminal performs the SIPTO service through the Femto cell and the Home (e)NodeB, handover to the macro cell occurs, the SIPTO PDN is connected to the L-GW, and as a result, the SIPTO PDN connection is cut.

That is, the SIPTO PDN connection follows an LIPA PDN connection creation method, and as a result, the target MME cannot know information on the SIPTO PDN while moving. Further, a method re-requesting connection to the terminal during the handover or in the TAU after completion of the handover requires a lot of modifications in the existing procedure.

Therefore, an object of the present invention is to present a method for automatically creating SIPTO PDN connection in a macro cell again when the SIPTO PDN connection is created in a Home (e)NodeB and a terminal moves to the macro cell.

The method will be described with reference to FIG. 5.

Figure 5:
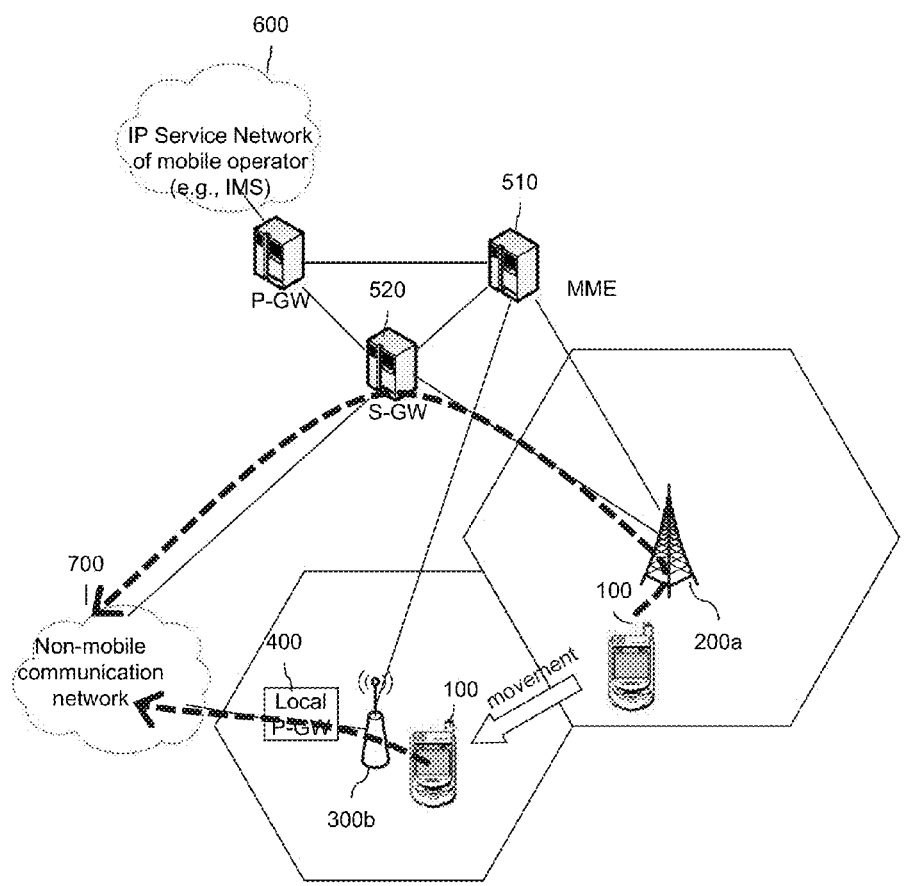
FIG. 5 is an exemplary diagram illustrating a process in which a UE 100 hands over an (e)NodeB 200a to a Home (e)NodeB 300b.

FIG. 5 is an exemplary diagram illustrating a process in which a UE 100 is handed over from an (e)NodeB 200a to a Home (e)NodeB 300b.

Referring to FIG. 5, for example, a mobile communication system such as an evolved packet system (EPS) is illustrated. The EPS includes a source base station 200a, a target base station 300b, an MME 510, an S-GW 520, and a P-GW 530. The source base station 200a may be the (e)NodeB and the target base station 300b may be the Home (e)NodeB.

The MME 510 is connected to the source base station 200a and the target base station 300b as illustrated in the figure.

The P-GW 530 is connected with a mobile communication operator network 600.

Meanwhile, the system illustrated in FIG. 5 is based on the EPS, but may be applied to even a 3GPP (universal mobile telecommunication system (UMTS). In the 3GPP UMTS, both a function of a control plane of the MME 510 and a function of a user plane of the S-GW 520 may be performed in a serving GPRS support node (not illustrated).

An operation will be described below with reference to FIG. 5.

When the UE 100 requests a service to the source base station, that is, the (e)NodeB 200b, an SGSN or the MME 510 which is a control entity in the core network judges whether data of the service requested by the UE 100 may be offloaded to the wired network 700. In this case, a provided access point may be the same as the mobile communication network 600 even through the wired network 700 as the public network. That is, an access point name (APN) representing a name of the access point is used similarly and SIPTO permission may be separately designated to each APN.

As such, when the UE 100 makes an access attempt, a specific APN is provided to an entity in a core network and the entity in the core network, for example, the MME 510 of the EPS or the serving GPRS support node of the UMTS may judge whether the access of the UE 100 is offloaded to nodes of the wired network 700 such as the public network. In this case, the control entity in the core network, for example, the MME 510 may decide whether to offload the data by the service requested service to the wired network 700 such as the public network by considering whether the base station which the UE 100 accesses is the (e)NodeB or the Home (e)NodeB and whether the base station supports the SIPTO.

When it is determined that the data is offloaded, a session for the data of the service is set to be offloaded to the wired network 700 through the S-GW 520.

Meanwhile, it is assumed that the UE 100 moves to the inside of a coverage of the target base station 300b, for example, the Home (e)NodeB.

A local gateway 400 is connected to the Home (e)NodeB 300b. The local gateway 400 is connected with a non-mobile communication network 700. The local gateway 400 is a gateway that is positioned between the Home (e)nodeB 300b and the wired network 700 and enables the SIPTO through the Home (e)NodeB 300b. That is, the local gateway 400 may create the session through a route between the Home (e)NodeB 300b and the wired network 700 and enables data transmission through the created bearer.

However, the session of the UE 100 set to pass through the wired network 700 in the source base station 200b, that is, the (e)NodeB may not be moved to the target base station 300b through seamless handover.

Hereinafter, a handover procedure will be described with reference to FIG. 6.

Figure 6:
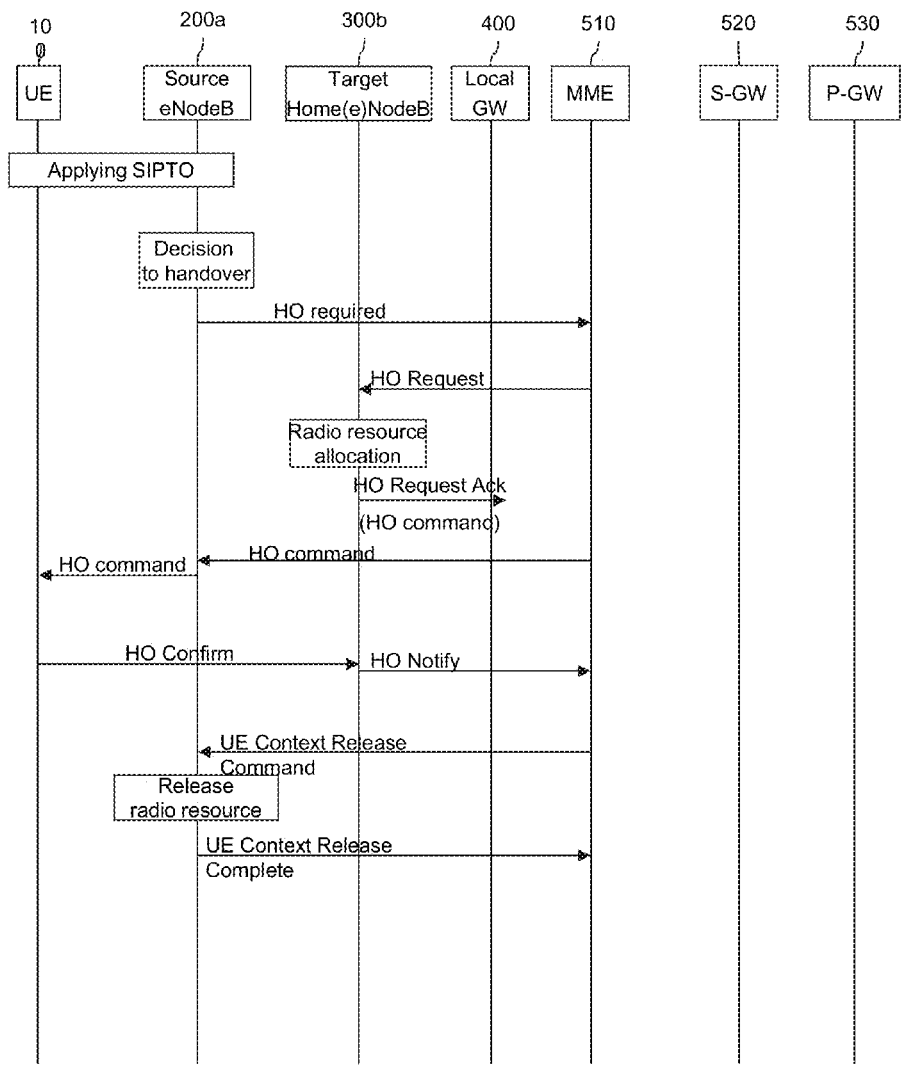
FIG. 6 illustrates one example of a handover process.

FIG. 6 illustrates one example of a handover process.

The handover process illustrated in FIG. 6 is a procedure achieved without changing the MME 510. The reason is that since the MME 510 is connected to the source base station 200a and the target base station 300b as illustrated in the figure, even though the UE 100 moves to the target base station 300b from the source base station 200a, the MME 510 is not changed, as illustrated in FIG. 5.

In detail, the UE 100 accesses the source base station, that is, the (e)NodeB 200a. In addition, the SIPTO service is applied to the UE 100, and as a result, the data of the UE is transmitted and received by being offloaded to the wired network 700 illustrated in FIG. 5.

In this case, when the UE 100 moves to the inside of the coverage of the target base station 300b, the source base station 200a decides handover and transmits a handover (HO) required message to the MME 510. The MME 510 transmits a HO request message to the target base station, that is, the Home (e)NodeB 300b in response to the HO requirement.

The target base station, that is, the Home (e)NodeB 300b allocates a radio resource for the UE 100 in advance and transmits the HO required response message, that is, an HO request ACK message to the MME 510. The HO request response message includes a handover command message, that is, an HO command message.

The MME 510 transmits the handover command message (that is, the HO command message) to the source base station, that is, the (e)NodeB 200a. The source base station, that is, the (e)NodeB 200a transmits the handover command message (that is, the HO command message) to the UE 100.

The UE 100 transmits a handover verification message, for example, an HO confirm message to the target base station, that is, the Home (e)NodeB 300b and the target base station, that is, the Home (e)NodeB 300b transmits a handover notification message, for example, an HO notify message to the MME 510.

The MME 510 transmits a UE context release command to the source base station 200a and the source base station 200a releases the radio resource. Subsequently, the source base station 200a transmits a UE context release complete message to the MME 510.

After the handover is completed through such a procedure, the UE 100 releases PDN connection and reactivates PDN connection in order to receive the SIPTO service from the target base station, that is, the Home (e)NodeB 300b again.

However, since the HO command is received an access stratum (AS) terminal of the UE 100, it just known that general handover is just performed. Since management of the PDN connection such as the SIPTO is performed on a non-access stratum (NAS) terminal, it cannot be known whether the existing PDN connection should be released and the PDN connection should be reactivated. Therefore, traffic of the UE 100 is cut off after the handover. Further, by this configuration, an application of the UE 100, for example, a web browser is only repeatedly reattempted and is not operated.

Figure 7:
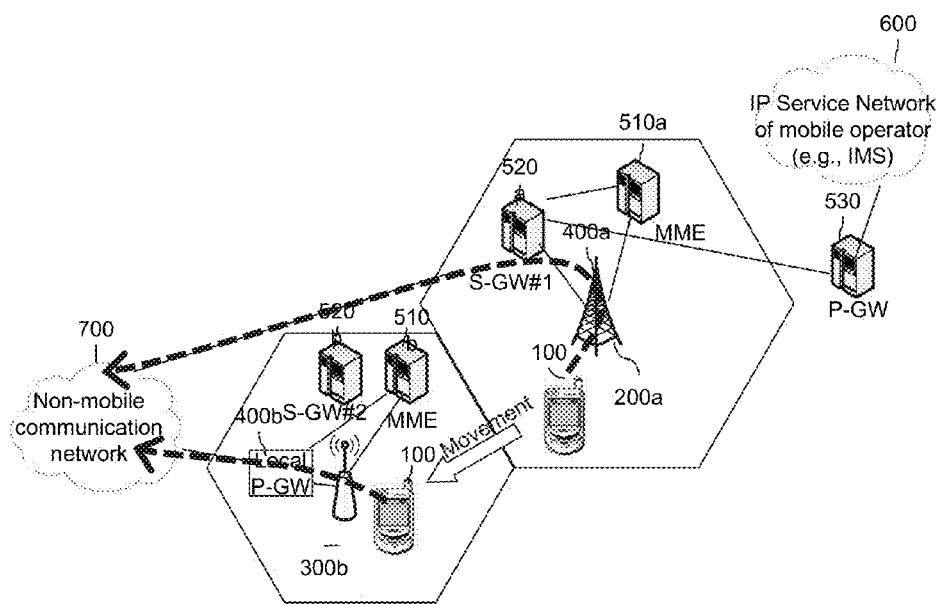
FIG. 7 is an exemplary diagram illustrating another process in which the UE 100 hands over the (e)NodeB 200a to the Home (e)NodeB 300b.

FIG. 7 is an exemplary diagram illustrating another process in which the UE 100 is handed over from the (e)NodeB 200a to the Home (e)NodeB 300b.

Referring to FIG. 7, the source base station 200a, that is, the (e)NodeB 200a is connected with a source MME 510a and a source S-GW 520a. The source S-GW 520a is connected with the P-GW 530. In addition, the target base station, that is, the Home (e)NodeB 300b is connected with a source MME 510b and further, connected with a local P-GW 400b.

An operation will be described below with reference to FIG. 7.

When the UE 100 requests a service to the source base station, that is, the (e)NodeB 200b, the MME 510a which is a control entity in the core network judges whether the data of the service requested by the UE 100 may be offloaded to the wired network 700.

When it is determined that the data is offloaded, the session for the data of the service is set to be offloaded to the wired network 700 through the S-GW 520a.

Meanwhile, it is assumed that the UE 100 moves to the inside of a coverage of the Home (e)NodeB 300b.

However, the session of the UE 100 set to pass through the wired network 700 in the (e)NodeB 200a may not be moved to the Home (e)NodeB 300b through seamless handover.

Hereinafter, the handover procedure will be described with reference to FIG. 8.

Figure 8:
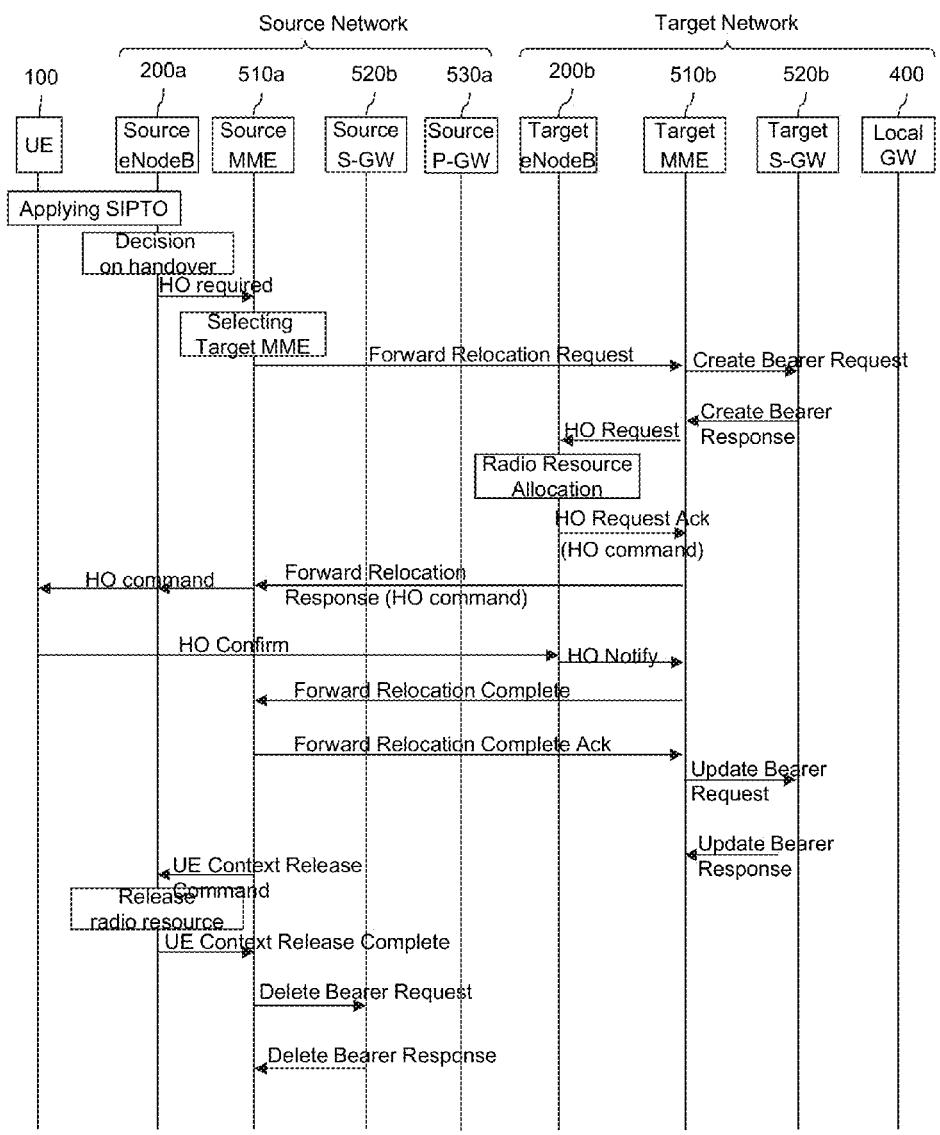
FIG. 8 illustrates one example of another handover process.

FIG. 8 illustrates one example of another handover process.

As illustrated in FIG. 8, a source network includes the source base station, the eNodeB 200a, the source MME 510a, a source S-GW 520a, and a P-GW 530a. In addition, a target network may include the target base station, that is, the Home (e)NodeB 200b, the target MME 510b, a target S-GW 520b, and a P-GW 530b.

The handover process illustrated in FIG. 8 is a procedure in which an EPC is relocated. The reason is that since the source MME 510a is connected to the source base station 200a and the target MME 510b is connected to the target base station 300b, when the UE 100 moves from the source base station 200a to the target base station 300b, the MME is changed.

In detail, the UE 100 accesses the source base station, that is, the (e)NodeB 200a. In addition, the SIPTO service is applied to the UE 100, and as a result, the data of the UE is transmitted and received by being offloaded to the wired network 700 illustrated in FIG. 7.

In this case, when the UE 100 moves to the inside of the coverage of the target base station 300b, the source base station 200a decides handover and transmits a handover (HO) required message to the source MME 510a.

The source MME 510a decides the target MME 510b in response to the HO requirement.

In addition, the source MME 510a transmits a relocation request message, for example, a forward relocation request message to the target MME 510b.

The target MME 510b transmits a bearer creation request message, for example, a create bearer request message to the target S-GW 520b. The target S-GW 520b transmits a bearer creation response message, for example, a create bearer response message to the target MME 510b.

The target MME 510b transmits a HO request message to the target base station, that is, the Home (e)NodeB 300b.

The target base station, that is, the Home (e)NodeB 300b allocates a radio resource for the UE 100 in advance and transmits an HO request response message, that is, an HO request ACK message to the target MME 510b. The HO request response message includes a handover command message, that is, an HO command message.

The target MME 510b transmits a relocation response message, for example, a forward relocation response message to the source MME 510a. The relocation response message, for example, the forward relocation response message includes the handover command message, that is, the HO command.

The source MME 510a transmits the handover command message (that is, the HO command message) to the source base station, that is, the (e)NodeB 200a. The source base station, that is, the (e)NodeB 200a transmits the handover command message (that is, the HO command message) to the UE 100.

The UE 100 transmits a handover verification message, for example, an HO confirm message to the target base station, that is, the Home (e)NodeB 300b and the target base station, that is, the Home (e)NodeB 300b transmits a handover notification message, for example, an HO notify message to the target MME 510b.

The target MME 510b transmits a relocation completion message, for example, a forward relocation complete message to the source MME 510a and the source MME 510a transmits a relocation completion response message, for example, a forward relocation complete ACK message to the target MME 510*b*.

The target MME 510*b* transmits a bearer update request message, for example, an update bearer request message to the target S-GW 520*b* and the target S-GW 520*b* transmits a bearer update response message, for example, an update bearer response message to the target MME 510*b*.

The source MME 510*a* transmits a UE context release command to the source base station 200*a* and the source base station 200*a* releases the radio resource. Subsequently, the source base station 200*a* transmits a UE context release complete message to the source MME 510*a*.

The source target MME 510*a* transmits a bearer deletion request message, for example, a delete bearer request message to the source S-GW 520*b* and the source S-GW 520*b* transmits a bearer deletion response message, for example, a delete bearer response message to the source MME 510*a*.

After the handover is completed through such a procedure, the UE 100 releases PDN connection and reactivates PDN connection in order to receive the SIPTO service from the target base station, that is, the Home (e)NodeB 300*b* again.

However, since the HO command is received as an access stratum (AS) terminal of the UE 100, it just known that general handover is just performed. Since management of the PDN connection such as the SIPTO is performed on a non-access stratum (NAS) terminal, it cannot be known whether the existing PDN connection should be released and the PDN connection should be reactivated. Therefore, traffic of the UE 100 is cut off after the handover. Further, by this configuration, an application of the UE 100, for example, a web browser is only repeatedly reattempted and is not operated.

Figure 9:
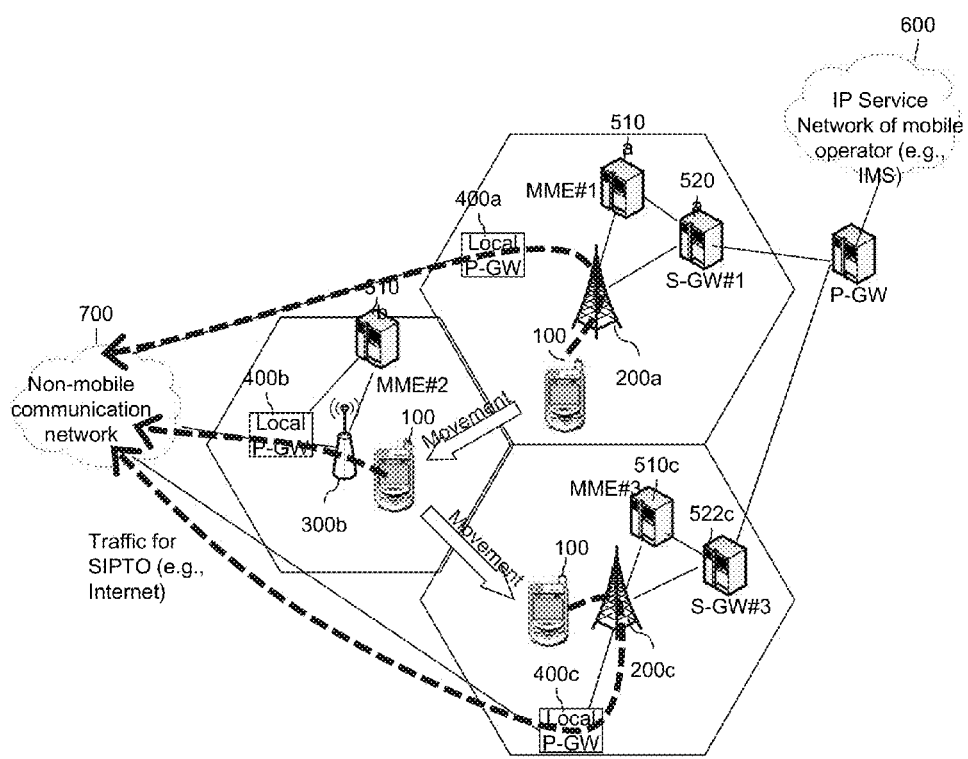
FIG. 9 is an exemplary diagram illustrating another process in which the UE 100 is handed over from the (e)NodeB 200a to the Home (e)NodeB 300b and thereafter, is handed over to the (e)NodeB 200c again.

FIG. 9 is an exemplary diagram illustrating another process in which the UE 100 is handed over from the (e)NodeB 200*a* to the Home (e)NodeB 300*b* and thereafter, is handed over to an (e)NodeB 200*c* again.

Referring to FIG. 9, the (e)Node B 200*a* is connected with the MME 510*a* and the S-GW 520*a*. The S-GW 520*a* is connected with the P-GW 530. In addition, the Home (e)NodeB 300*b* is connected with the MME 510*b* and further, connected with the local P-GW 400*b*. Further, the (e)NodeB 200*c* is connected with an MME 510C and an S-GW 520*c*.

An operation will be described below with reference to FIG. 9.

When the UE 100 requests a service to the source base station, that is, the (e)NodeB 200*a*, the MME 510*a* which is a control entity in the core network judges whether the data of the service requested by the UE 100 may be offloaded to the wired network 700.

When it is determined that the data is offloaded, the session for the data of the service is set to be offloaded to the wired network 700 through the S-GW 520*a*.

Meanwhile, it is assumed that the UE 100 moves to the inside of a coverage of the target base station 300*b*, for example, the Home (e)NodeB.

However, the session of the UE 100 set to pass through the wired network 700 in the source base station 200*b*, that is, the (e)NodeB may not be moved to the target base station 300*b* through seamless handover.

If the UE 100 requests the service to the Home (e)NodeB 300*b* again even by any method, it is assumed that the MME 510*b* connected to the Home (e)NodeB 300*b* applies the SIPTO to the data of the service requested by the UE 100.

Then, it is assumed that the UE 100 moves to the inside of a coverage of another base station not connected with the local P-GW 400*b*, that is, the (e)NodeB 200*c* again.

Similarly even in this case, the session of the UE 100 applied with the SIPTO service may not be moved to the (e)NodeB 200 through seamless handover. Even when the UE 100 moves to another Home (e)NodeB not connected to the local P-GW 400*b*, the UE 100 may not be moved due to the same reason.

Therefore, hereinafter, a scheme that may provide the SIPTO service to the UE 100 even after the handover will be described.

In this case, a scheme is presented so as to exert a minimum influence while using or maintaining the existing function for compatibility with the existing 3GPP network system. To this end, the following premise matters are given.

The terminal and the network supports a multiple PDN function.

The terminal and the network supports an H(e)NB access function.

The terminal and the network support LIPA PDN connection and SIPTO PDN connection.

The SIPTO PDN connection is provided even in a Femto base station, that is, the Home (e)NodeB.

Meanwhile, the scheme presented in the specification intends to implement an SIPTO Femto function considering mobility of a macro cell in the Home (e)NodeB.

In addition, it is assumed that the SIPTO PDN connection is created through the local GW in the Home (e)NodeB.

In addition, the specification presents two schemes below.

According to a first scheme, under the situation that the UE 100 is handed over from the Home (e)NodeB 300*b* which is the source base station to the (e)NodeB 200*c* which is the target base station, the source MME 510*b* connected to the Home (e)NodeB 300*b* notifies to the UE 100 resetting of the PDN connection after handover.

In detail, the Home (e)NodeB 300*b* which is the source base station decides the handover and requests the handover to the source MME 510*b*. In this case, the Home (e)NodeB 300*b* which is the source base station transfers a target TAI (that is, cell id) together.

The source MME 510*b* verifies whether the SIPTO PDN connection is activated (whether the corresponding PDN has SIPTO permission information) in the terminal and whether the target base station is the macro base station, that is, the (e)NodeB 200*c*, and when the target base station is the (e)NodeB 200*c*, the source MME 510*b* deletes the SIPTO PDN connection. In this case, the source MME 510*b* may decide whether to delete the SIPTO PDN connection by additionally considering subscriber information, an operator policy, a local configuration, and the like.

After deleting the SIPTO PDN connection, the source MME 510*b* transmits a request message of resetting PDN connection to the UE 100. In this case, the source MME 510*b* notifies that the resetting of the PDN connection is performed after the handover. That is, the source MME 510*b* transfers re-request information, an indicator, or information such as a cause value after moving from the present source base station to the target base station.

The UE 100 judges the above transferred information after the handover to request the SIPTO PDN connection in the macro base station.

According to a second scheme, since the source L-GW 400*b* deletes the SIPTO PDN due to the handover, the source L-GW 400*b* notifies, to the source MME 510*b*, allowing the UE 100 to create the SIPTO PDN again after the handover.

In detail, the Home (e)NodeB 300*b* which is the source base station decides the handover and request the deletion of the SIPTO PDN connection to the source L-GW 400*b*. In this case, since the L-GW 400*b* deletes the SIPTO PDN due to the handover, the source L-GW 400*b* transfers the information such as the indicator, the cause value, and the like which notifies allowing the UE 100 to create the SIPTO PDN again after the handover together.

The source L-GW 400*b* deletes bearers in order to delete the SIPTO PDN connection and transfers information to request recreation of the SIPTO PDN connection up to the source MME 510*b*.

After deleting the SIPTO PDN connection, the source MME 510*b* may notify a request message to reset the PDN connection to the terminal and in this case, transfers a message to reset the PDN connection after the handover. That is, the source MME 510*b* transfers information such as information, an indicator, or a cause value to reset the PDN connection after moving, not in a present cell.

The UE 100 requests the SIPTO PDN connection in the macro base station which is the target base station, that is, the (e)NodeB 300*c* through judgment based on the above transferred information after performing the handover.

Figure 10:
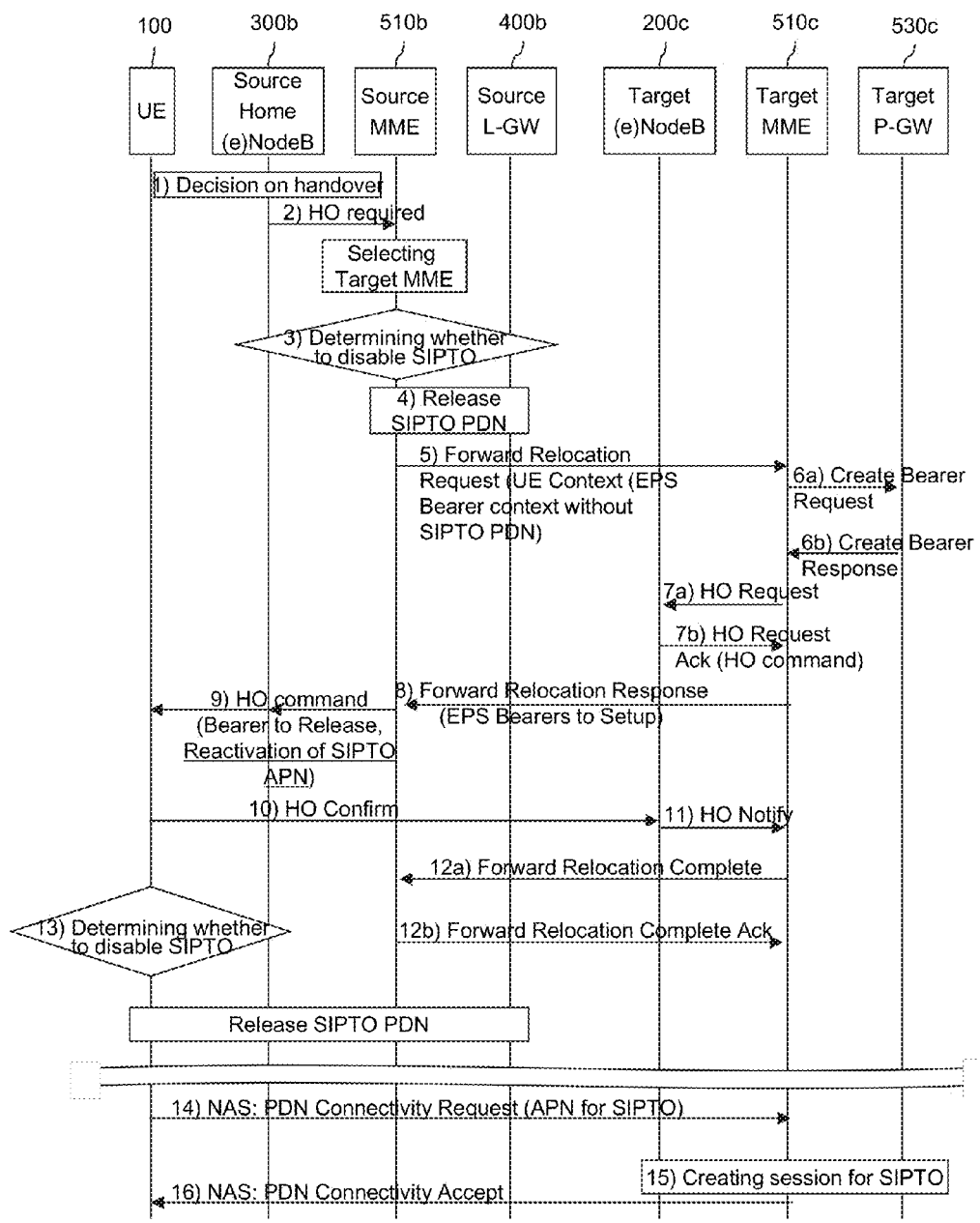
FIG. 10 is an exemplary diagram illustrating a flowchart according to a first scheme.
Figure 13:
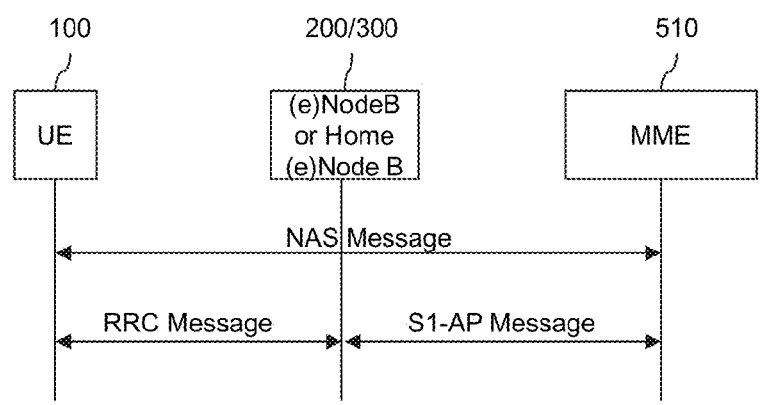
FIG. 13 exemplarily illustrates a protocol of a message illustrated in FIG. 10.

FIG. 10 is an exemplary diagram illustrating a flowchart according to the first scheme and FIG. 13 exemplarily illustrates a protocol of a message illustrated in FIG. 10.

As known by referring to FIG. 10, according to the first scheme, under the situation that the UE 100 is handed over from the Home (e)NodeB 300*b* which is the source base station to the (e)NodeB 200*c* which is the target base station, the source MME 510*b* connected to the Home (e)NodeB 300*b* notifies to the UE 100 the resetting of the PDN connection after the handover.

Before describing each procedure by referring to FIG. 10, in detail, the messages illustrated in FIG. 10 will be described below in brief with reference to FIG. 13.

Messages transmitted and received between the UE 100 and the source base station or target base station, for example, the (e)NodeB 200 or the Home (e)NodeB 300 are messages based on a radio resource control (RRC) protocol. Messages transmitted and received between the source base station or the target base station and the MME 510 are messages based on an S1 application protocol (S1-AP).

Messages transmitted and received between the UE 100 and the MME 510 or an SGSN (not illustrated) are messages by a non-access stratum (NAS) protocol. The messages by the NAS protocol are capsulated into a message by an RRC protocol corresponding to the access stratum (AS) protocol and the S1-AP message to be transmitted.

Hereinafter, each procedure will be described below in brief before a detailed description based on the drawings.

An SIPTO based session is set according to a request from the UE 100 positioned in the coverage of the source base station, that is, the Home (e)NodeB 300*b*.

While the session is in progress, the UE 100 moves to the inside of the (e)NodeB 200*c* which is the target base station. In this case, the (e)NodeB 200*c* is connected with the illustrated target MME 510*c* and connected with even various other MMEs.

Then, when the handover is performed, the source MME 510*b* decides an appropriate MME in charge for the UE 100. In this case, for example, it is assumed that the target MME 510*c* is decided as the appropriate MME in charge according to the decision.

For example, according to the decision, when the MME in charge is changed to the target MME 510*c*, the source MME 510*b* requests to the target MME 510*c* a forward relocation request for X2-based handover, S1-based handover, and Inter RAT handover.

Meanwhile, when the MME in charge is changed, the source MME 510*b* deletes a PDN for the existing SIPTO, and notifies to the UE 100 deactivating the SIPTO through the Home (e)NodeB 300*b* which is the source base station and reactivating the SITPO after the handover.

Hereinafter, each procedure will be described in detail with reference to FIG. 10.

First, according to the request from the UE 100 positioned in the coverage of the source base station, that is, the source Home (e)NodeB 300*b*, when a general session passing through a core network and the SIPTO based session passing through the wired network are set, the source MME 510*b* (alternatively, the SGSN) stores a result thereof in a UE context. In this case, the UE context includes an MM/EPS bearer context for mobility and session management. In addition, a parameter indicating whether the set session is the SIPTO based session, for example, an SIPTO_Session_indicato is set in the UE context. That is, the source MME 510*b* (alternatively, SGSN) sets an indication indicating that the created session is the SIPTO based session, for example, an SIPTO_Session_Indicator in the UE context by the unit of the PDN, the bearer, or an IP address and distinguishes the set SIPTO_Session_Indicator from other general sessions.

While the session is in progress, the UE 100 moves geographically.

1) Then, the source base station, that is, the source Home (e)NodeB 300*b* selects the (e)NodeB 200*c* which is the target base station to be handed over by considering states of base stations at which the UE is positioned.

2) The source base station, that is, the source Home (e)NodeB 300*b* transmits a handover required message to the source MME 510*b*. The handover required message may be a handover required message based on the S1-AP protocol. The message may include an id of the (e)NodeB 200*c* which is the target base station.

Then, the source MME 510*b* decides an appropriate MME in charge among various MMEs that manage the (e)NodeB 200*c* which is the target base station. It is assumed that the target MME 510*c* is decided as the MME in charge according to the decision.

3) Meanwhile, the MME 510*b* decides whether the SIPTO is deactivated with the change of the MME in charge.

4) The source MME 510*b* allows the source L-GW 400*b* to release the SIPTO PDN according to the decision.

Next, the source MME 510*b* transmits a relocation request message, for example, a forward relocation request message to the target MME 510*c*. In this case, the source MME 510*b* transfers a UE context to the target MME 510*c*. The UE context includes an MM/EPS bearer context and the like. In this case, information on the SIPTO PDN is excluded from information included in the bearer context.

Next, the target MME 510*c* determines an S-GW or a P-GW in charge.

6) when the target MME 510*c* selects a target P-GW 530*c*, the target MME 510*c* transmits a bearer creation request message, for example, a create bearer request message, and the target P-GW 530*c* transmits a bearer creation response message to the target P-GW 530*c*.

7) When the target MME 510*c* receives the bearer creation response message or a bearer creation end message, the target MME 510*c* transmits a handover request message, for example, a Handover Request message for notifying preparing the handover to an (e)NodeB 200*c* which is the target base station. The handover request message includes an EPS Bearer to Setup parameter. The EPS Bearer to Setup parameter includes only general session information passing through the core network.

The (e)NodeB 200*c* which is the target base station transmits a response message, for example, a Handover Request Ack message to the target MME 510C. The response message, for example, a Handover Request Ack message includes a handover command message, for example, a Handover command message.

8) The target MME 510c transmits a relocation response message, for example, a Forward Relocation Response message to the source MME 510b. The relocation response message, for example, a Forward Relocation Response message may further include the EPS Bearer to Setup parameter. Only information on a general session passing through the core network is included in the EPS Bearer to Setup.

9) When the source MME 510b receives the relocation response message, the source MME 510b transmits a handover command, for example, a Handover Command message to the UE 100 through the source base station, that is, the source Home (e)NodeB 300b. The Handover Command message may include information or an indicator of reactivating the SIPTO after the handover, for example, a Reactivation of SIPTO. The Reactivation of SIPTO may be expressed as a value of a Result or cause parameter.

Further, the Handover Command message may include a bearer release parameter, for example, a Bearers to Release parameter. In this case, the Bearers to Release which is the transferred parameter becomes an SIPTO session used in the source (e)NodeB.

10) The UE 100 receives the handover command message and transmits a handover confirm message, for example, a Handover Confirm message to the (e)NodeB 200c which is the target base station.

11 to 12) The (e)NodeB 200c which is the target base station transmits a handover notification message to the target MME 510c, the target MME 510c transmits a relocation complete message, for example, a Forward Relocation complete message to the source MME 510b and receives the response message.

13) Meanwhile, the UE 100 verifies the Result or cause parameter to release the corresponding bearer of a radio session if an ongoing session is based on the SIPTO.

14 to 16) Meanwhile, the UE 100 transmits a PDN Connectivity Request message to the target MME 510c through the (e)NodeB 200c which is the target base station, in order to reset the PDN connection after the handover, based on the Reactivation of SIPTO. The PDN Connectivity Request message is based on an NAS protocol and includes an APN. In addition, the UE 100 receives the PDN Connectivity Request message from the target MME 510c.

As described above, FIG. 10 illustrates the MME and the S-GW based on the EPC, but the concept of the present invention may also be applied to an UMTS. In the case of the UMTS, both the MME and the S-GW may be integrated into an SGSN. Accordingly, the signal transmission and reception between the MME and the S-GW illustrated in FIG. 10 is not performed, but is processed within the SGSN.

Figure 11:
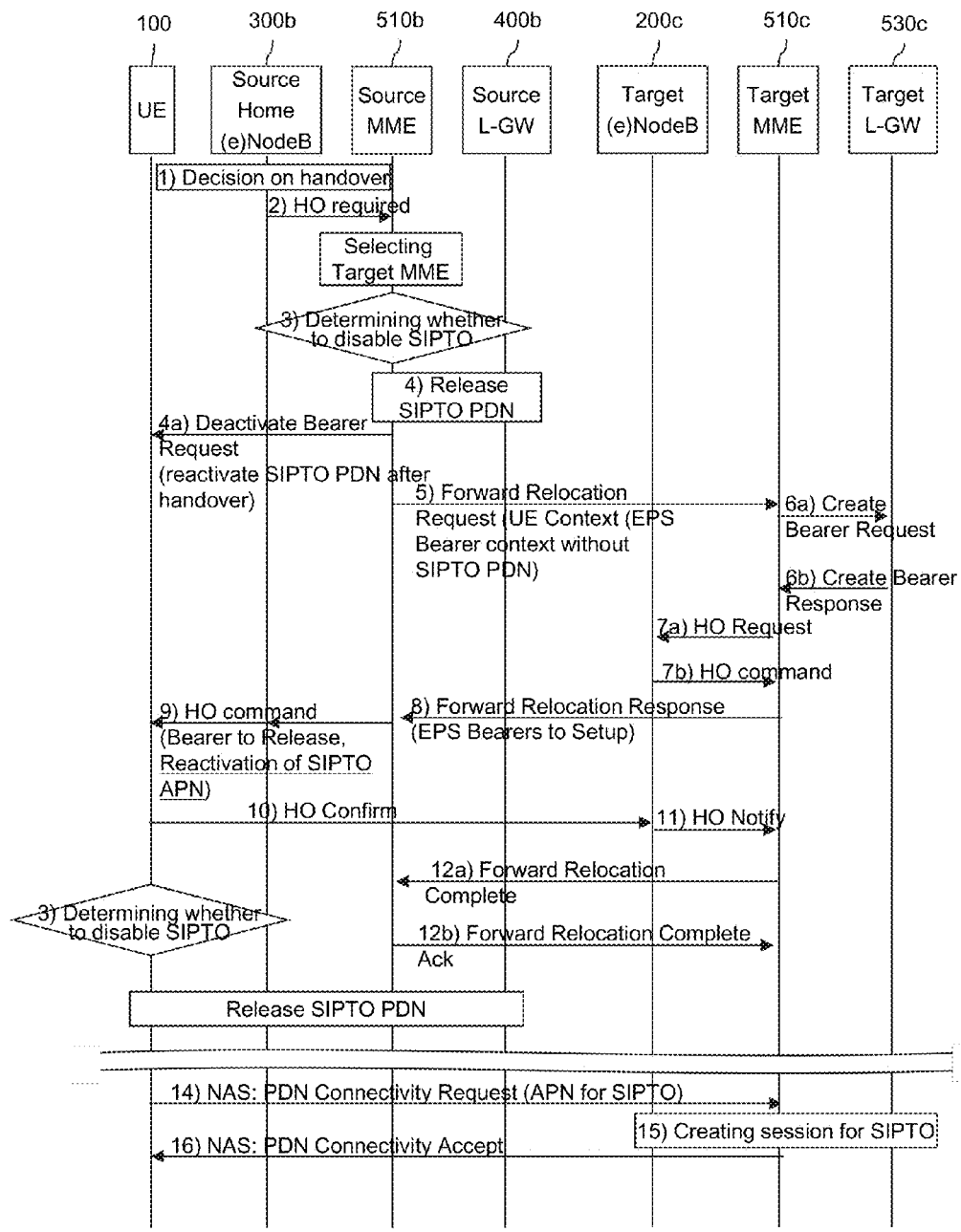
FIG. 11 is an exemplary diagram illustrating a flowchart according to a modified example of the first scheme.

FIG. 11 is an exemplary diagram illustrating a flowchart according to a modified example of the first scheme.

The processes illustrated in FIG. 11 are almost similar to the processes illustrated in FIG. 10. Hereinafter, only different processes will be described in detail.

1 to 3) When the UE 100 receives an SITPO service through a Home (e)NodeB 300b which is a source base station and then moves to the (e)NodeB 200c which is the target base station, the source Home (e)NodeB 300b transmits a handover required message to the source MME 510b. Then, the source MME 510b decides an appropriate MME in charge among various MMEs that manage the (e)NodeB 200c which is the target base station and determines SIPTO deactivation or not.

4) The source MME 510b allows the source L-GW 400b to release the SIPTO PDN according to the decision.

Next, the source MME 510b transfers a bearer deactivation request message, for example, a Deactivate bearer request message to the UE 100 through the source Home (e)NodeB 300b. In the bearer deactivation request message, information, an indicator, or a parameter to reset (Reactivation of SIPTO) the SIPTO PDN connection after the handover is included. The information, the indicator, or the parameter to reset (Reactivation of SIPTO) the SIPTO PDN connection after the handover in the bearer deactivation request message may be expressed by a value of the cause or result parameter.

Meanwhile, the UE 100 verifies the Result or cause parameter to delete (release) the corresponding bearer of a radio session if an ongoing session is based on the SIPTO.

In addition, after the handover, the UE 100 transmits a PDN Connectivity Request message to the target MME 510c through the (e)NodeB 200c which is the target base station, in order to reset the PDN connection, based on the Reactivation of SIPTO.

Figure 12:
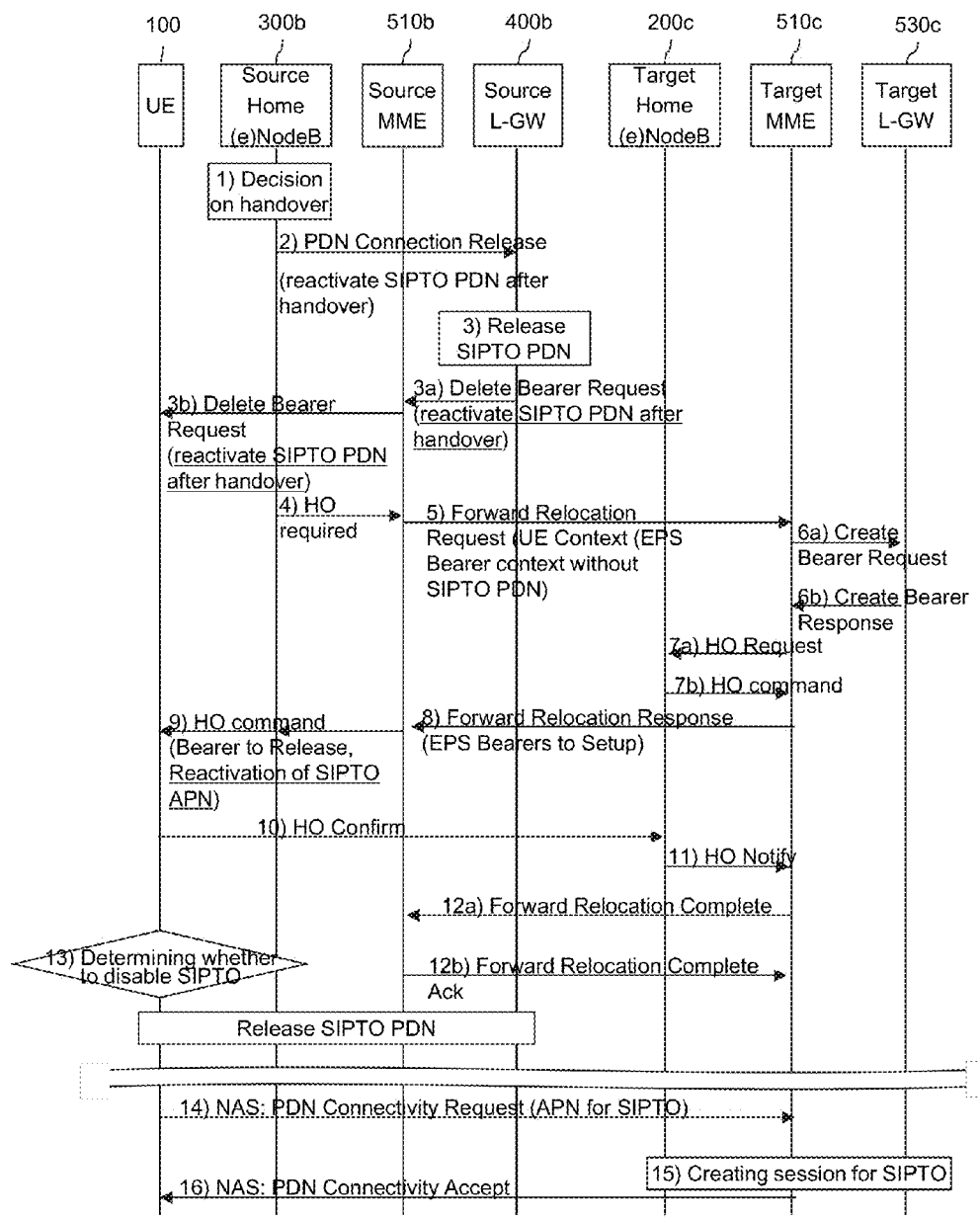
FIG. 12 is an exemplary diagram illustrating a flowchart according to a second scheme.

FIG. 12 is an exemplary diagram illustrating a flowchart according to a second scheme.

As described with reference to FIG. 12, when the UE 100 receives the SITPO service through the Home (e)NodeB 300b which is the source base station and then moves geographically to move to the (e)NodeB 200c which is the target base station, according to the second scheme, since the source L-GW 400b deletes the SIPTO PDN due to the handover, the source L-GW 400b notifies allowing the UE 100 to re-create the SIPTO PDN after the handover to the source MME 510b, and the source MME 510b notifies the notification to the UE 100.

The processes illustrated in FIG. 12 are almost similar to the processes illustrated in FIG. 10. Hereinafter, only different processes will be described in detail.

1) When the UE 100 receives the SITPO service through the Home (e)NodeB 300b which is the source base station and then moves geographically to the (e)NodeB 200c which is the target base station, the source Home (e)NodeB 300b determines the handover.

2) If the source Home (e)NodeB 300b determines the handover, the Home (e)NodeB 300b which is the source base station transmits a PDN connection release request message, for example, a PDN Connection Release message to the source L-GW 400b. In the PDN connection release request message, information, an indicator, or a parameter to reset (Reactivation of SIPTO) the SIPTO PDN connection after the handover is included. The information, the indicator, or the parameter to reset the SIPTO PDN connection after the handover may be expressed by a value of the cause or result parameter.

3) The source L-GW 400b releases the SIPTO PDN and transmits a bearer deletion request message, for example, a Delete Bearer Request message to the source MME 510b. In the bearer deletion request message, information, an indicator, or a parameter to reset (Reactivation of SIPTO) the SIPTO PDN connection after the handover is included.

Then, the source MME 510b transmits the bearer deletion request message to the UE 100.

Meanwhile, the UE 100 transmits a PDN Connectivity Request message to the target MME 510c through the (e)NodeB 200c which is the target base station, in order to reset the PDN connection after the handover, based on the Reactivation of SIPTO. The PDN Connectivity Request message is based on an NAS protocol and includes an APN. In addition, the UE 100 receives the PDN Connectivity Request message from the target MME 510c.

Figure 14:
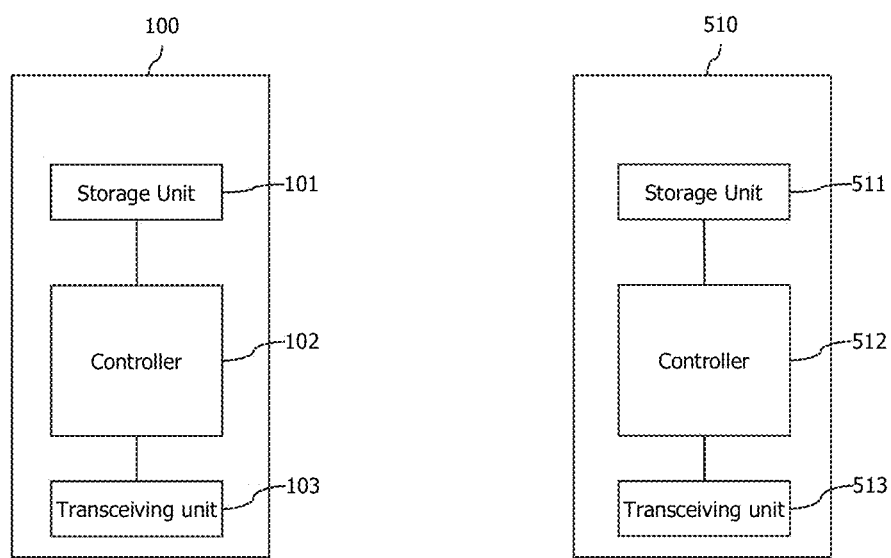
FIG. 14 is a configuration block diagram of a UE 100 and an MME 510 according to the present invention.

FIG. 14 is a configuration block diagram of the UE 100 and the MME 510 according to the present invention.

As illustrated in FIG. 14, the UE 100 includes a storage means 101, a controller 102, and a transmitting/receiving unit 103. In addition, the MME 510 includes a storage means 511, a controller 512, and a transmitting/receiving unit 513.

The storage means 101 and 511 store the methods illustrated in FIGS. 9 to 13.

The controllers 102 and 512 control the storage means 101 and 511 and the transmitting/receiving units 103 and 513. In detail, the controllers 102 and 512 execute the methods stored in the storage means 101 and 511. In addition, the controllers 102 and 512 transmit the aforementioned signals through the transmitting/receiving units 103 and 513.

Although preferable embodiments of the present invention has been exemplarily described as above, the scope of the present invention is limited to only the specific embodiments, and as a result, various modifications, changes, or enhancements of the present invention can be made within the spirit of the present invention and the scope disclosed in the appended claims.

The invention claimed is:

1. A method of supporting mobility of selected IP traffic offload (SIPTO), the method performed by a server undertaking a control plane in a mobile communication network and comprising:
   receiving a handover required message for a terminal, which receives a SIPTO service via a source base station, toward a target base station;
   deciding whether to deactivate the SIPTO service;
   performing a process for releasing a public data network (PDN) connection for the SIPTO, based on the decision;
   receiving, from a local gateway (L-GW), a bearer deletion request message including information for reactivating the SIPTO after the handover; and
   transmitting to the terminal via the source base station the bearer deletion request message,
   wherein the source base station is a Home (e)NodeB and the target base station is an (e)NodeB, and
   wherein the local gateway is a gateway for enabling the SIPTO or Local IP Access (LIPA) through the Home (e)NodeB.

2. The method of claim 1, further comprising:
   receiving the SIPTO service by bar the terminal from another (e)NodeB before receiving the SIPTO service from the source base station and performs handover to the source base station.

3. The method of claim 1, further comprising:
   transmitting, by the server, a relocation request message or a forward relocation request message including bearer context information other than PDN information for the SIPTO service to a target mobility management entity (MME).

4. A method of supporting mobility of a selected IP traffic offload (SIPTO) service which a terminal receives from a source base station, comprising:
   receiving, by the terminal, a bearer deletion request message including information for reactivating the SIPTO after handover from the source base station;
   performing, by the terminal, handover from the source base station to the target base station; and
   transmitting, by the terminal, a public data network (PDN) connection request message to the target base station based on the information,
   wherein the source base station is a Home (e)NodeB and the target base station is an (e)NodeB, and
   wherein the bearer deletion request message is transmitted from a local gateway (L-GW) for enabling the SIPTO or Local IP Access (LIPA) through the Home (e)NodeB via a source mobility management entity (MME).

5. The method of claim 4, further comprising:
   receiving, by the terminal, the SIPTO service from another (e)NodeB before receiving the SIPTO service from the source base station and performs handover to the source base station.

6. The method of claim 4, further comprising:
   deciding whether to reactivate the SIPTO service after the handover based on the information.

7. A server undertaking a control plane in a mobile communication network to assure mobility of a selected IP traffic offload (SIPTO) service, comprising:
   a receiver;
   a transmitter; and
   a controller operatively connected to the transmitter and the receiver, the controller configured to:
     receive a bearer deletion request message including information for reactivating the SIPTO after handover from the source base station;
     perform handover from the source base station to the target base station; and
     transmit a public data network (PDN) connection request message to the target base station based on the information,
   wherein the source base station is a Home (e)NodeB and the target base station is an (e)NodeB, and
   wherein the bearer deletion request message is transmitted from a local gateway (L-GW) for enabling the SIPTO or Local IP Access (LIPA) through the Home (e)NodeB via a source mobility management entity (MME).

8. The server of claim 7, wherein:
   the terminal receives the SIPTO service from another (e)NodeB before receiving the SIPTO service from the source base station and performs handover to the source base station.

9. The server of claim 7, wherein:
   the controller is configured to transmit a relocation request message or a forward relocation request message including bearer context information other than PDN information for the SIPTO service to a target mobility management entity (MME).

10. A terminal receiving a selected IP traffic offload (SIPTO) service from a source base station, comprising:
   a receiver;
   a transmitter; and
   a controller operatively connected to the receiver and the transmitter, the controller configured to:
     receive a bearer deletion request message including information for reactivating the SIPTO after handover from the source base station;
     perform handover from the source base station to the target base station; and
     transmit a public data network (PDN) connection request message to the target base station based on the information,
   wherein the source base station is a Home (e)NodeB and the target base station is an (e)NodeB, and
   wherein the bearer deletion request message is transmitted from a local gateway (L-GW) for enabling the SIPTO or Local IP Access (LIPA) through the Home (e)NodeB via a source mobility management entity (MME).

* * * * *